United States Patent
Odagaki et al.

(10) Patent No.: US 12,172,207 B2
(45) Date of Patent: Dec. 24, 2024

(54) METHOD FOR MANUFACTURING CONTINUOUS CASTING MOLD

(71) Applicant: JFE STEEL CORPORATION, Tokyo (JP)

(72) Inventors: Tomoya Odagaki, Tokyo (JP); Kohei Furumai, Tokyo (JP); Norichika Aramaki, Tokyo (JP); Kohei Ishida, Fukuyama (JP); Daiki Yanagida, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 465 days.

(21) Appl. No.: 17/770,848

(22) PCT Filed: Oct. 23, 2020

(86) PCT No.: PCT/JP2020/039839
§ 371 (c)(1),
(2) Date: Apr. 21, 2022

(87) PCT Pub. No.: WO2021/079971
PCT Pub. Date: Apr. 29, 2021

(65) Prior Publication Data
US 2022/0388057 A1    Dec. 8, 2022

(30) Foreign Application Priority Data

Oct. 24, 2019 (JP) ................. 2019-193479

(51) Int. Cl.
| | | |
|---|---|---|
| B22D 11/057 | (2006.01) | |
| B22D 11/059 | (2006.01) | |
| B22F 7/08 | (2006.01) | |
| B22F 10/28 | (2021.01) | |
| B33Y 10/00 | (2015.01) | |
| B33Y 70/00 | (2020.01) | |
| B33Y 80/00 | (2015.01) | |
| C22C 19/07 | (2006.01) | |

(52) U.S. Cl.
CPC .......... *B22D 11/057* (2013.01); *B22D 11/059* (2013.01); *B22F 7/08* (2013.01); *B22F 10/28* (2021.01); *B33Y 10/00* (2014.12); *B33Y 70/00* (2014.12); *B33Y 80/00* (2014.12); *C22C 19/07* (2013.01); *B22F 2301/15* (2013.01)

(58) Field of Classification Search
CPC ....... B22D 11/057; B22D 11/059; B22F 7/08; B22F 10/28; B22F 2301/15; B22F 10/20; B33Y 10/00; B33Y 70/00; B33Y 80/00; C22C 19/07; C22C 1/0433; C22C 19/03; C22C 19/056; C22C 19/058; C22C 30/00; B23K 2103/12; B23K 2103/26; B23K 26/0006; B23K 26/144; B23K 26/1464; B23K 26/342; C23C 24/106
See application file for complete search history.

(56) References Cited

FOREIGN PATENT DOCUMENTS

| | | |
|---|---|---|
| CN | 103447485 A | 12/2013 |
| CN | 103805813 A | 5/2014 |
| CN | 109226705 A | 1/2019 |
| EP | 2839901 A1 | 2/2015 |
| EP | 3213838 A1 | 9/2017 |
| JP | H01-170550 A | 7/1989 |
| JP | 2008-030123 A | 2/2008 |
| JP | 2015-107522 A | 6/2015 |
| JP | 2017-024078 A | 2/2017 |
| JP | 2018-126742 A | 8/2018 |
| JP | 2018-192530 A | 12/2018 |
| JP | 2019-098371 A | 6/2019 |
| JP | 2019-122973 A | 7/2019 |
| JP | 2019-130578 A | 8/2019 |
| RU | 2017114537 A | 10/2018 |
| SU | 904879 A1 | 2/1982 |
| WO | 2014002409 A1 | 1/2014 |
| WO | WO-2018016101 A1 * | 1/2018 ............. B22D 11/00 |

OTHER PUBLICATIONS

WO-2018016101-A1: Espacenet English machine translation (Year: 2018).*
Nov. 21, 2022 Office Action issued in Russian Patent Application No. 2022110305.
Dec. 1, 2020 International Search Report issued in International Patent Application No. PCT/JP2020/039839.
Oct. 7, 2023 Office Action issued in Chinese Patent Application No. 202080073692.6.
Extended European Search Report issued in European Patent Application No. 20879474.3.
Jul. 19, 2023 Office Action issued in Korean Patent Application No. 10-2022-7012209.

* cited by examiner

*Primary Examiner* — Adil A. Siddiqui
(74) *Attorney, Agent, or Firm* — Oliff PLC

(57) ABSTRACT

A method for manufacturing a continuous casting mold in which cracking and spalling are less likely to occur in a filling laminate. The method includes filling a plurality of concave portions formed on an inner surface of a copper-made mold copper plate or a copper alloy-made mold copper plate used for continuously casting steel at least in a region including a meniscus position of molten steel in a casting process with a metal having a thermal conductivity different from that of the mold copper plate.

6 Claims, No Drawings

METHOD FOR MANUFACTURING CONTINUOUS CASTING MOLD

TECHNICAL FIELD

This application relates to a method for manufacturing a continuous casting mold with which it is possible to perform continuous casting at a higher casting speed, which is excellent in terms of heat resistance, and which has a filling laminate filled with a metal of a low thermal conductivity.

BACKGROUND

In a continuous casting method, in which a cast slab as a material to be rolled is continuously manufactured from molten steel refined by using a converter or an electric furnace, the molten steel is poured into a water-cooled continuous casting mold and cooled through the water-cooled continuous casting mold. The molten steel starts to be solidified from the contact surface with the mold, and the entire molten steel is then cooled so as to be made into a cast slab. In the case where cooling is performed non-uniformly in the mold, since a solidified layer is formed non-uniformly in the solidification process of the cast slab, stress caused by the shrinkage and deformation of the solidified layer is applied to the solidified layer. In the case where there is a high degree of cooling non-uniformity, such non-uniformity causes, for example, longitudinal cracking to occur in the cast slab or surface cracking to occur in a subsequent process.

To improve stress non-uniformity occurring in the solidification process, methods for controlling the cooling rate in the vicinity of a meniscus in the mold have been put into practice.

For example, Patent Literature 1 proposes a method in which generated stress is regularly distributed and locally accumulated by controlling the heat flux from molten steel to a continuous casting mold to increase and decrease regularly and cyclically. Specifically, Patent Literature 1 describes a technique in which a large number of concave portions (holes) having a diameter of 2 mm to 10 mm are formed at a regular interval of 5 mm to 20 mm on the surface of the mold in the vicinity of the meniscus of the molten steel in the mold, and the concave portions are filled with a metal such as nickel having a thermal conductivity lower than copper (in the present description, referred to as a "metal of a low thermal conductivity") or a ceramic.

In addition, Patent Literature 1 states that, in the case of the method in which a large number of concave portions are formed on the surface of a mold and the concave portions are filled with a metal of a low thermal conductivity or the like, since stress generated on the surface of the mold is dispersed, there is a decrease in strain in each of the portions filled with the metal of a low thermal conductivity, which results in cracking being less likely to occur in the surface of the mold copper plate. Moreover, Patent Literature 1 states that, in the case where the concave portion has a circular shape or a quasi-circular shape, since the boundary surface between the filled metal and the copper has a curvilinear shape, stress is less likely to be concentrated on the boundary surface, which results in an advantage that cracking is less likely to occur in the surface of the mold copper plate.

Patent Literature 2 proposes a continuous casting mold in which a coating layer of nickel or a nickel-containing alloy as a metal of a low thermal conductivity is formed in concave portions formed on the surface of the mold. Specifically, a coating layer of a nickel-cobalt alloy (Ni—Co alloy), a nickel-chromium alloy (Ni—Cr alloy), or the like is formed in the concave portions. Moreover, Patent Literature 2 states that the ratio of thermal resistance ($\lambda$) between the mold copper plate and the metal of the coating layer filling the concave portions is set to satisfy the relational expression $0.5 < \lambda_{Cu}/\lambda_{coating} < 15.0$. Here, $\lambda_{Cu}$ denotes the thermal conductivity (W/(m×K)) of the mold copper plate, and $\lambda_{coating}$ denotes the thermal conductivity (W/(m×K)) of the metal of the coating layer.

Patent Literature 2 states that it is not preferable that the ratio ($\lambda_{Cu}/\lambda_{coating}$) be 0.5 or less, because this results in surface cracking occurring in the cast slab due to a low thermal resistance of the coating layer. On the other hand, Patent Literature 2 states that it is not preferable that the ratio ($\lambda_{Cu}/\lambda_{coating}$) be 15.0 or more, because this results in a risk that, for example, coating layer spalling occurs due to an excessive increase in the temperature of the coating layer caused by a high thermal resistance of the coating layer when continuous casting is performed.

Incidentally, in a continuous casting process, nowadays, a continuous casting mold is generally installed with an electromagnetic stirring device for stirring molten steel in the mold. In this case, to inhibit the attenuation of magnetic field intensity applied to the molten steel from the electromagnetic coil of the electromagnetic stirring device, a copper alloy having a decreased electrical conductivity is used for the mold copper plate. Generally, in the case of a copper alloy, the thermal conductivity decreases with a decrease in electrical conductivity. Therefore, there is a case where a copper alloy-made mold copper plate having a thermal conductivity of about ½ that of pure copper (having a thermal conductivity of about 400 W/(m×K)) is used.

CITATION LIST

Patent Literature

PTL 1: Japanese Unexamined Patent Application Publication No. 1-170550
PTL 2: Japanese Unexamined Patent Application Publication No. 2018-192530

SUMMARY

Technical Problem

By forming a large number of concave portions (holes) on the surface of a mold, and by filling the concave portions with a metal of a low thermal conductivity or the like, thermal stress generated when molten steel is solidified is cyclically and regularly dispersed. Consequently, it is possible to inhibit surface cracking from occurring in a cast slab, and it is also possible to inhibit surface damage from occurring in a continuous casting mold. To increase such inhibiting effects, investigations have been conducted regarding the shape, number, and arrangement of concave portions and the thermal conductivity of a metal or the like to fill the concave portions. On the other hand, to improve productivity, there is a demand for increasing a casting velocity and extending the life of a continuous casting mold.

In a continuous casting mold in which a large number of concave portions (holes) are formed on the surface of a mold and the concave portions are filled with a metal of a low thermal conductivity or the like, large stress is generated on the boundary surface between the concave portions on the surface of the mold and a mold copper plate when casting is performed due to the difference in thermal strain between the metal of a low thermal conductivity and copper. By forming concave portions having a circular shape or having a small size to inhibit stress from being generated due to the difference in thermal strain, spalling and fracturing are inhibited from occurring in the filled metal of a low thermal conductivity, and cracking is inhibited from occurring in the surface of the mold copper plate.

Moreover, in the case where the casting velocity is increased, there is an increase in the amount of heat transferred per unit time from the molten steel to the mold. In this case, there is a local increase to a higher degree in the amount of heat transferred to the mold, and there is an increase in the amount of heat accumulated in the filled metal of a low thermal conductivity. Therefore, to inhibit surface cracking from occurring in a cast slab, there is a demand for further increasing the strength and heat resistance of the mold copper plate and the filled metal.

The disclosed embodiments have been made in view of the situation described above, and an object of the disclosed embodiments is to provide a method for manufacturing a continuous casting mold in which it is possible to inhibit large stress from being generated on the boundary surface between concave portions on the surface of the mold and a mold copper plate when casting is performed and in which cracking and spalling are less likely to occur due to resisting heat accumulated in a metal of a low thermal conductivity filling the concave portions.

Solution to Problem

To achieve the object described above, the subject matter of the disclosed embodiments is as follows.

[1] A method for manufacturing a continuous casting mold, in which plural concave portions formed on an inner surface of a copper-made mold copper plate or a copper alloy-made mold copper plate used for continuously casting steel at least in a region including a meniscus position of molten steel in a casting process are filled with a metal having a thermal conductivity different from a thermal conductivity of the mold copper plate in which the metal filling the concave portion is a laminate formed of two or more layers in such a manner that the layers are stacked on top of one another from a bottom of each of the concave portions to an open of the concave portion in a direction normal to an inner surface of the mold, and in which each of a second layer and layers above the second layer is a nickel layer or a nickel-based alloy layer having a thickness of 0.2 mm to 2 mm formed by radiating a laser beam while feeding nickel powder or nickel-based alloy powder to a position irradiated with the laser beam to melt and solidify the nickel powder or the nickel-based alloy powder, and the second layer and the layers above the second layer form a multi-layered built-up filling laminate having a total thickness of 1 mm to 10 mm.

[2] The method for manufacturing a continuous casting mold according to item [1] above, in which a first layer is a nickel coating layer or a cobalt-nickel-alloy coating layer containing 7 mass % to 35 mass % of nickel and the balance being cobalt having a thickness of 30 μm to 500 μm.

[3] The method for manufacturing a continuous casting mold according to item [1] or [2] above, in which, after having formed the nickel coating layer or the cobalt-nickel-alloy coating layer in a first layer, a nickel-copper alloy or a cobalt-nickel-copper alloy containing 1 mass % to 20 mass % of copper is formed by irradiating the nickel coating layer or the cobalt-nickel-alloy coating layer with a laser beam to melt the coating layer.

[4] The method for manufacturing a continuous casting mold according to item [3] above, in which, after having formed, the nickel-copper alloy or the cobalt-nickel-copper alloy containing 1 mass % to 20 mass % of copper in the first layer by diffusing copper from the mold copper plate, or while forming the nickel-copper alloy or the cobalt-nickel-copper alloy containing 1 mass % to 20 mass % of copper in the first layer by diffusing copper from the mold copper plate, the multi-layered built-up filling laminate including nickel layers or nickel-based alloy layers formed by radiating a laser beam while feeding nickel powder or nickel-based alloy powder to melt and solidify the nickel powder or the nickel-based alloy powder as the second layer and the layers above the second layer is formed, such that the filling laminate has a gradient chemical composition with gradually decreasing copper content from 1 mass % to 20 mass % in the first layer toward an outermost layer.

Advantageous Effects

In the embodiment according to item [1] above, since the filled metal is a filling laminate formed of two or more layers in such a manner that the layers are stacked on top of one another from the bottom of the concave portion to the open of the concave portion in a direction normal to the inner surface of the mold, in which each of the second layer and the layers above the second layer is a nickel layer or a nickel-based alloy layer having a thickness of 0.2 mm to 2 mm formed by radiating a laser beam while feeding nickel powder or nickel-based alloy powder to melt and solidify the powder, and the second layer and the layers above the second layer form a multi-layered built-up filling laminate having a total thickness of 1 mm to 10 mm, there is an increase in adhesion strength between the layers, which results in advantages that large stress is less likely to be generated on the boundary surface between the concave portion on the surface of the mold and the mold copper plate when casting is performed and that cracking and spalling are less likely to occur due to resisting heat accumulated in the metal of a low thermal conductivity filling the concave portions.

In the embodiment according to item [2] above, since, as the first layer, a nickel coating layer or a cobalt-nickel-alloy coating layer is formed in the concave portions in a copper-made mold copper plate or a copper alloy-made mold copper plate, there is an advantage that it is possible to achieve good adhesion strength between the mold copper plate and the filled metal.

In the embodiment according to item [3] above, since, after the first layer, that is, the nickel coating layer or the cobalt-nickel-alloy coating layer have been formed, a nickel-copper alloy or a cobalt-nickel-copper alloy containing 1 mass % to 20 mass % of copper is formed by diffusion of copper from the mold copper plate by irradiating the nickel coating layer or the cobalt-nickel-alloy coating layer with a laser beam to melt the coating layer. Thereby, constituent diffusion occurs between the first layer, that is, the coating layer, and the mold copper plate, and there is an advantage that it is possible to increase the adhesion strength.

In the embodiment according to item [4] above, since a multi-layered built-up filling laminate formed of nickel layers or nickel-based alloy layers is formed by radiating a laser beam while feeding nickel powder or nickel-based alloy powder to melt and solidify the nickel powder or the nickel-based alloy powder, it is possible to efficiently utilize the energy of the laser beam to melt the powder described above, there is an effect of decreasing the thermal strain of the mold copper plate as a result of a decrease in heat influence on the mold copper plate. In addition, since a filling laminate having a gradient chemical composition with gradually decreasing copper content from 1 mass % to 20 mass % in the first layer toward the outermost layer is formed, it is possible to exert the essential heat resistance intrinsic to nickel and a nickel-based alloy in the outermost layer in which heat load is large, which results in an advantage that cracking and spalling are less likely to occur in the outermost layer.

DETAILED DESCRIPTION

In a continuous casting method for steel, a water-cooled continuous casting mold having a copper-made mold copper plate or a copper alloy-made mold copper plate on the side of a surface in contact with molten steel is used. In the operation of continuous casting, while the molten steel is poured into the continuous casting mold, molten steel is continuously cast by extracting heat from the molten steel through the surface of the mold copper plate whose back surface is cooled with cooling water to solidify the molten steel to form an outer shell of a cast slab. The molten steel starts to be solidified in the vicinity of the meniscus located in the upper part of the mold, and the thickness of the solidified layer increases toward the lower part of the mold. A cast slab having a solidified outer shell and a non-solidified inner portion, that is, molten steel, is cooled in the secondary cooling zone disposed below the mold after having been drawn out from the mold so that the central portion in the thickness direction of the cast slab is solidified to manufacture a cast slab. Here, the term "meniscus" denotes the position of the upper liquid surface of the molten steel in the mold.

In the case where a non-uniform solidified layer is formed in the process of solidifying a cast slab, stress is generated due to the shrinkage and deformation of the solidified layer, which results in, for example, longitudinal cracking occurring in the surface of the cast slab or surface cracking occurring in a steel product in a subsequent process when there is a high degree of non-uniformity.

Therefore, to inhibit non-uniform solidification from occurring in a cast slab, a technique in which, by controlling a heat flux from molten steel to a continuous casting mold to increase and decrease regularly and cyclically, since generated stress is distributed regularly, stress is inhibited from locally increasing is proposed.

Specifically, a technique has been put into practice in which, in a continuous casting mold having a copper-made mold copper plate or a copper alloy-made mold copper plate, both of which are highly effective for cooling as a result of being excellent in terms of thermal conductivity, a large number of concave portions (holes) having a diameter of 2 mm to 10 mm are formed at a regular interval of 5 mm to 20 mm across the entire width of the mold copper plate (there are mold copper plates having various sizes, and the widths of mold copper plates are about 1800 mm to 2500 mm) on the inner surface of the mold copper plate in a range from a position located about 50 mm lower than the upper edge of the mold to a position located about 250 mm lower than the upper edge of the mold, which corresponds to a range in the vicinity of a meniscus, and the formed concave portions are filled with a metal of a low thermal conductivity, that is, a metal having a lower thermal conductivity than copper, such as nickel.

This technique is a technique in which, by providing regular thermal conductivity distribution to the surface of a mold copper plate, regular cooling rate distribution is provided to the surface of a cast slab, which results in regularly distributed stress being generated. In addition, by using this technique, since it is possible to control the stress not to be excessively increased, it is possible to realize a continuous casting operation in which cracking or the like does not occur in the surface of the cast slab.

On the other hand, on the surface of the mold copper plate, heat tends to be accumulated on the surface of the metal of a low thermal conductivity filling the concave portions, and, in contrast, heat tends to be dissipated from the surface, around the concave portions, of the copper-made mold copper plate or the copper alloy-made mold copper plate which has good thermal conductivity. Consequently, there is a difference in temperature between the metal of a low thermal conductivity filling the concave portions and the surface of the mold copper plate around the metal of a low thermal conductivity. To increase productivity in continuous casting, in the case where a casting velocity is 2.5 m/min or more, there is an increase in the amount of heat accumulated on the surface of the metal of a low thermal conductivity filling the concave portions. Therefore, there is also an increase in stress generated on the boundary surface between the concave portions and the mold copper plate.

Since the shape of the concave portions is usually a small circular cylindrical shape having a diameter of 10 mm or less, such concave portions have the effect of inhibiting stress cracking from occurring due to thermal strain generated on the boundary surface described above. However, in the case where there is an increase in the amount of heat accumulated on the surface of the metal of a low thermal conductivity, there is a problem of cracking occurring due to heat on the boundary surface between the concave portions and the mold copper plate on the surface of the mold copper plate, and there is a problem of the metal of a low thermal conductivity being separated from the mold copper plate. In addition, when a nickel coating layer is used as a metal of a low thermal conductivity, there is a problem of cracking occurring inside the nickel coating layer filling the concave portion, and there is a problem of fracturing or the like occurring in the nickel coating layer.

The method for manufacturing a continuous casting mold according to the disclosed embodiments is intended to increase adhesion strength between the filled metal and the mold copper plate to improve spalling resistance between the filled metal formed of a metal of a low thermal conductivity and the mold copper plate while maintaining the satisfactory heat resistance of the metal of a lower thermal conductivity filling concave portions.

In a copper-made mold copper plate or a copper alloy-made mold copper plate, in which plural concave portions are formed on the inner surface of the mold at least in a region including a meniscus position of molten steel in a casting process, as a first layer in the concave portion, a nickel coating layer or a cobalt-nickel-alloy coating layer (containing 7 mass % to 35 mass % of nickel and the balance being cobalt) having a thickness of 30 μm to 500 μm is first formed. Although the first coating layer has good-quality adhesion strength with the mold copper plate, there is no constituent diffusion between the coating layer and the mold copper plate. Here, it is preferable that the diameter of such concave portions be 2 mm to 10 mm and that the concave portions be arranged on the inner surface of the continuous casting mold at a regular interval of 5 mm to 20 mm.

In the disclosed embodiments, to increase the adhesion strength between the first coating layer and the mold copper plate, constituent diffusion is allowed to occur between the first coating layer and the mold copper plate. As a specific example, diffusion joining, in which, by irradiating the first coating layer with a laser beam having a wavelength of 900 nm to 1020 nm to heat the first coating layer to a temperature of 1400° C. or higher, the first coating layer is melted and copper diffuses from the mold into the first coating layer, is performed. The copper content in a nickel-copper-alloy layer or a cobalt-nickel-copper-alloy layer formed by diffusion is set to be 1 mass % to 20 mass %.

Subsequently, while irradiating the concave portions with the same laser beam in an argon gas atmosphere, by feeding nickel powder or nickel-based alloy powder to the position irradiated with the laser beam to form a melt pool of the powder in each of the concave portions, and by solidifying the formed melt pool, a built-up filling laminate in which the first coating layer is coated is formed. That is, in the disclosed embodiments, a filling laminate formed of two or more layers of metal fills the concave portion. By using such a method for forming layers utilizing a laser-beam buildup method, a built-up filling laminate having excellent heat resistance is formed. The thickness of each of the constituent layers of the built-up filling laminate is set to be 0.2 mm to 2 mm, and a multi-layered built-up filling laminate having a total thickness of 1 mm to 10 mm is formed. The melting temperature of nickel or a nickel-based alloy is about 1400° C., which is about 300° C. higher than the melting point of copper. Since a multi-layered built-up filling laminate is formed by melting and solidifying the constituent layers, diffusion occurs between the constituent layers including an alloy layer formed between the first coating layer and the mold copper plate, which results in an increase in interlayer adhesion strength.

The first coating layer and each of the second layer and the layers above the second layer, which are formed by using a buildup method, are stacked on top of one another from the bottom of the concave portion to the open of the concave portion in a direction normal to the inner surface of the mold. Copper which is mixed in the first coating layer when diffusion joining utilizing a laser beam is performed diffuses into the second layer and the layers above the second layer when a laser-beam buildup process is subsequently performed. By controlling the incidence energy and irradiation time of the laser beam, it is possible to adjust the amount of diffusion between the layers. However, in the case where the incidence energy is excessively large, since there is an increase in crystal grain size in the solidified built-up filling laminate, there is a deterioration in heat resistance and strength. Therefore, it is not preferable that the incidence energy be excessively large.

In addition, in the case where there is an increase in copper content, there is a deterioration in the heat resistance and corrosion resistance of a nickel-based alloy. Therefore, it is preferable that the amount of copper contained in the metal of a low thermal conductivity filling the concave portion decrease toward the outermost constituent layer. That is, it is preferable that a filling laminate having a gradient chemical composition in which the copper content gradually decreases from the first layer toward the outermost layer be formed. It is even possible to form a gradient chemical composition in which the copper content in the outer layer is about 1/10 of that in the inner layer by controlling melting conditions by using a laser beam. For example, by forming three layers by using a laser-beam buildup method, it is possible to form a filling laminate whose outermost layer has a copper content of almost zero (0). Consequently, for the outermost layer, it is possible to form a layer made of a known nickel-based alloy such as Hastelloy, an Inconel alloy, or the like, which is excellent in terms of corrosion resistance and abrasion resistance at a high temperature, by using the buildup method.

Examples of a method for building up a metal include a method utilizing a welding rod and a method in which an alloy plate is melted. However, in the case of these methods, since a larger amount of heat energy dissipates from the welding rod and the non-melted alloy plate through thermal conductivity than in the case of a method utilizing powder, it is difficult to control the amount of heat, and it is necessary to supply excessively large energy from outside. Therefore, there is a strong effect on the mold copper plate, which may result in large thermal strain being generated.

In the case of the laser-beam buildup method according to the disclosed embodiments where a laser-beam buildup process is performed by feeding metal powder to be used through a laser-irradiation nozzle along with a laser beam while the surface of the mold copper plate is scanned with the nozzle, since it is possible to use the laser beam energy only for melting the fed metal powder, it is most efficient. In addition, by managing and controlling the size and temperature of a pool of molten metal formed by using the energy of the laser beam, it is possible to achieve satisfactory adhesiveness between the mold copper plate and the filling laminate interface due to appropriate metal diffusion when the filling laminate is formed. As a result, it is possible to manufacture a continuous casting mold having layers filled with a metal of a low thermal conductivity which is excellent in terms of adhesiveness, heat resistance, corrosion resistance, and abrasion resistance.

It is preferable that the copper content in the copper-containing coating layer formed in the concave portion as the first layer be 1 mass % to 20 mass %. In the case where the copper content in the first layer is less than 1 mass %, since there is insufficient diffusion joining between the coating layer as the first layer and the mold copper plate, there is a decrease in adhesion strength between the coating layer as the first layer and the mold copper plate. On the other hand, there is a sufficient amount of diffusion of copper from the mold copper plate in the case where the copper content is 20 mass % or less, and, in the case where the copper content is more than 20 mass %, since there is a decrease in the energy absorption rate of a laser beam having a wavelength of 900 nm to 1020 nm, it is difficult to increase the temperature, which results in an increase in time required for melting.

In addition, it is preferable that the thickness of the coating layer as the first layer be 30 μm to 500 μm. In the case where the thickness of the coating layer as the first layer is less than 30 μm, since there is an increase in the copper content in the coating layer as the first layer when joining utilizing copper diffusion is performed by radiating a laser beam, there is a decrease in the energy absorption rate of a laser beam. On the other hand, it is not preferable that the thickness be more than 500 μm, because this results in an increase in the ratio of the thickness of the first layer, which is poorer in terms of heat resistance than a heat-resistant nickel-based alloy typified by Hastelloy or the like, to the total thickness of the metal of a low thermal conductivity filling the concave portion.

The thickness of each of the second layer and the layers above the second layer formed by using the buildup method is set to be 0.2 mm to 2 mm. In the case where the thickness per layer formed by using the buildup method is less than 0.2 mm, it is necessary that the particle size of the metal powder to be used be small enough. It is not preferable that such fine powder be used from the viewpoint of a working environment and yield. In the case where the thickness per layer formed by using the buildup method is more than 2 mm, it is necessary that the amount of metal melted in the concave portion be large enough. It is not preferable that the amount of metal melted be large, because this results in a significant deviation of the chemical composition of the layer formed by using a buildup method from the intended chemical composition, which provides excellent heat resistance, due to difficulty in controlling the amount of copper mixed in from the base (mold copper plate).

The total thickness of the multi-layered built-up filling laminate formed of the second layer and the layers above the second layer is set to be 1 mm to 10 mm. In the case where the total thickness is less than 1 mm, since there is an increased variation in the solidification of a cast slab due to insufficient thickness of the layer of the metal of a low thermal conductivity, cracking tends to occur in the surface of the cast slab. On the other hand, in the case where the total thickness is more than 10 mm, since there is an increase in thermal stress on the surface of the mold copper plate due to an excessive increase in the amount of heat accumulated on the surface of the layer of the metal of a low thermal conductivity, there is an increased risk that damage occurs in not only the portion of the metal of a low thermal conductivity but also the mold copper plate.

Examples of a known nickel-based alloy which is particularly excellent in terms of heat resistance and corrosion resistance include a nickel-based heat-resistant alloy. Examples of a nickel-based heat-resistant alloy include Hastelloy C276 (57 mass % Ni-16 mass % Mo-15 mass % Cr-5 mass % Fe-2.5 mass % Co-4 mass % W), Inconel 600 (72 mass % Ni-14 mass % Cr-6 mass % Fe), Ni—Cr (50 mass % Ni-50 mass % Cr), NiCoCrAlY (47.9 mass % Ni-23 mass % Co-20 mass % Cr-8.5 mass % Al-0.6 mass % Y), Waspaloy (58 mass % Ni-19 mass % Cr-14 mass % Co-4.5 mass % Mo-3 mass % Ti), and the like. It is preferable that the powder of one of these nickel-based heat-resistant alloys be used as a nickel-based alloy powder for forming a nickel-based alloy layer for the second layer and the layers above the second layer formed by using a buildup method.

In the case where there is an increase in the thickness of the second layer and the layers above the second layer formed by using a buildup method, there is a deterioration in the roughness of the surface of the built-up filling laminate. Therefore, after having formed a layer by using a laser-beam buildup method, by polishing the surface to obtain a flat surface with a surface roughness represented by Ry of 10 μm or less, it is possible to inhibit abnormal abrasion from occurring in the built-up filling laminate. Here, the expression "surface roughness represented by Ry" denotes the maximum height prescribed in JIS B 0601-1994.

The continuous casting mold may be made of pure copper, which contains 100 mass % of copper, or made of a copper alloy containing 90 mass % or more of copper and the balance being aluminum, chromium, zirconium, and the like. The thermal conductivity of pure copper is about 400 W/(m×K), the thermal conductivity of a copper alloy is 20% to 30% lower than that of pure copper, the thermal conductivity of Ni is about 90 W/(m×K), and the thermal conductivity of Hastelloy is about 11 W/(m×K).

EXAMPLES

Hereafter, the disclosed embodiments will be described in detail in accordance with experimental results regarding these embodiments.

Concave portions (holes) having a diameter of 5 mm and a depth of 3 mm were formed on a test specimen made of a copper alloy (having a chemical composition containing 0.87 mass % of chromium, 0.11 mass % of zirconium, and the balance being copper and having a width of 30 mm, a length of 50 mm, and a thickness of 30 mm), and a nickel coating layer having a thickness of 300 μm was formed in the concave portions. Subsequently, the formed nickel coating layer was irradiated with a laser beam (having a power of 2000 W) to perform diffusion joining. Subsequently, a buildup process, in which, while nickel powder or nickel-based alloy powder having a particle size of 40 μm to 120 μm is fed into the concave portion, a semiconductor laser beam having a wavelength of 950 nm to 1070 nm was radiated to form a nickel layer or a nickel-based alloy layer (having a thickness of 0.7 mm), was performed four times to form four layers so that the concave portion was filled with the nickel layers or the nickel-based alloy layers. The particle size of the nickel powder or nickel-based alloy powder was defined as a diameter corresponding to 50% in the cumulative distribution of a sphere-equivalent diameter based on volume obtained by using a laser diffraction-scattering method. In addition, the feeding rate of the nickel powder or the nickel-based alloy powder was 3.3 g/min, and the nozzle-scanning speed was 600 mm/min.

By using pure nickel for the nickel powder, and by using the powder of nickel-based heat-resistant alloys, that is, nickel-cobalt alloy (containing 17 mass % of Ni and the balance being cobalt), Inconel 600, and Hastelloy C276, for the nickel-based alloy powder, example samples 1 to 4 were prepared as the test specimens of the disclosed embodiments. As a comparative sample, a test specimen was prepared by performing a nickel coating treatment five times in the concave portion to fill the concave portion with nickel coating layers. The surface of each of the test specimens was subjected to surface grinding after having been subjected to the grinding process so that surface roughness represented by Ry of 6 μm was obtained. Here, "surface roughness represented by Ry" denotes the maximum height prescribed in JIS B 0601-1994.

To evaluate the adhesiveness between the copper alloy and the filled metals of low thermal conductivity (pure nickel and nickel-based alloys), a thermal shock test was performed. The evaluation results are given in Table 1. The thermal shock test was performed in such a manner that, after having performed heating at a temperature of 950° C. for 20 minutes in air, rapid water cooling was performed. By repeating such a cycle, the evaluation was performed on the basis of the cycle number at which cracking was observed in the surface of the filling laminate formed of layers by using a loupe.

TABLE 1

|  | Filled Metal | Evaluation Result | Amount of Copper Diffusion (Copper content, mass %) | | | | |
|---|---|---|---|---|---|---|---|
|  |  |  | Coating Layer | Second Layer | Third Layer | Fourth Layer | Outermost Layer |
| Example Sample 1 | Pure Nickel | 15 Cycles | 4.8 | 2.1 | 1.2 | 0.5 | 0.08 |
| Example Sample 2 | Nickel-Cobalt | 16 Cycles | 5.3 | 2.1 | 1.5 | 0.4 | 0.1 |
| Example Sample 3 | Inconel 600 | 17 Cycles | 4.5 | 2.4 | 1.1 | 0.6 | 0.04 |
| Example Sample 4 | Hastelloy C276 | 19 Cycles | 4.4 | 1.9 | 1.1 | 0.3 | 0.1 |
| Comparative Sample | Nickel Coating Layer | 10 Cycles | 0 | 0 | 0 | 0 | 0 |

In the case of the comparative sample, cracking occurred in the surface of the filling layer after 10 cycles. In contrast, in the case of the example samples, cracking occurred after cycles more than that in the case of the comparative sample, which indicates good results. In addition, the amount of copper diffusion was investigated for each layer by performing X-ray fluorescence spectrometry, and the results are also given in Table 1. From these results, it was clarified that copper diffusion is effective for improving the adhesiveness and heat resistance of the metal of a low thermal conductivity.

INDUSTRIAL APPLICABILITY

The continuous casting mold according to the disclosed embodiments is excellent in terms of heat resistance, corrosion resistance, and abrasion resistance when used as a steel-making mold for continuously casting molten steel and excellent as a high-efficiency continuous casting mold effective for high-speed casting.

In addition, by applying the disclosed embodiments to not only the concave portions on the surface of a mold described above but also the portions of the surface of the mold copper plate other than the concave portions, and by forming a filling laminate by using a laser-beam lamination buildup method used in the disclosed embodiments instead of forming a nickel coating layer or a cobalt coating layer on the surface of the mold copper plate, even in the case of an ordinary mold having a flat surface without concave portions, it is possible to increase the service life of the mold by inhibiting cracking from occurring due to thermal stress generated on the surface of the mold copper plate.

The invention claimed is:

1. A method for manufacturing a continuous casting mold, the method comprising:
    filling a plurality of concave portions formed on an inner surface of a copper-made mold copper plate or a copper alloy-made mold copper plate used for continuously casting steel at least in a region including a meniscus position of molten steel in a casting process with a metal having a thermal conductivity different from a thermal conductivity of the mold copper plate,
    wherein the metal filling the concave portion is a laminate formed of two or more layers such that the layers are stacked on top of one another from a bottom of each of the concave portions to an opening of the concave portion in a direction normal to an inner surface of the mold, and
    each of a second layer and layers above the second layer is a nickel layer or a nickel-based alloy layer having a thickness in a range of 0.2 mm to 2 mm formed by radiating a laser beam while feeding nickel powder or nickel-based alloy powder to a position irradiated with the laser beam to melt and solidify the nickel powder or the nickel-based alloy powder, and
    the second layer and the layers above the second layer form a multi-layered built-up filling laminate having a total thickness in a range of 1 mm to 10 mm.

2. The method for manufacturing a continuous casting mold according to claim 1, wherein a first layer is a nickel coating layer or a cobalt-nickel-alloy coating layer containing in a range of 7 mass % to 35 mass % of nickel, and the balance being cobalt having a thickness in a range of 30 μm to 500 μm.

3. The method for manufacturing a continuous casting mold according to claim 2, wherein, after having formed the nickel coating layer or the cobalt-nickel-alloy coating layer in the first layer, a nickel-copper alloy or a cobalt-nickel-copper alloy containing in a range of 1 mass % to 20 mass % of copper is formed by irradiating the nickel coating layer or the cobalt-nickel-alloy coating layer with a laser beam to melt the coating layer.

4. The method for manufacturing a continuous casting mold according to claim 3, wherein, after having formed the nickel-copper alloy or the cobalt-nickel-copper alloy in the first layer by diffusing copper from the mold copper plate, or while forming the nickel-copper alloy or the cobalt-nickel-copper alloy in the first layer by diffusing copper from the mold copper plate, the multi-layered built-up filling laminate including nickel layers or nickel-based alloy layers formed by radiating a laser beam while feeding nickel powder or nickel-based alloy powder to melt and solidify the nickel powder or the nickel-based alloy powder as the second layer and the layers above the second layer is formed, such that the multi-layered built-up filling laminate has a gradient chemical composition with gradually decreasing copper content from 1 mass % to 20 mass % in the first layer toward an outermost layer.

5. The method for manufacturing a continuous casting mold according to claim 1, wherein, after having formed a nickel coating layer or a cobalt-nickel-alloy coating layer in a first layer, a nickel-copper alloy or a cobalt-nickel-copper alloy containing in a range of 1 mass % to 20 mass % of copper is formed by irradiating the nickel coating layer or the cobalt-nickel-alloy coating layer with a laser beam to melt the coating layer.

6. The method for manufacturing a continuous casting mold according to claim 3, wherein, after having formed the nickel-copper alloy or the cobalt-nickel-copper alloy in the first layer by diffusing copper from the mold copper plate, or while forming the nickel-copper alloy or the cobalt-nickel-copper alloy in the first layer by diffusing copper from the mold copper plate, the multi-layered built-up filling laminate including nickel layers or nickel-based alloy layers formed by radiating a laser beam while feeding nickel powder or nickel-based alloy powder to melt and solidify the nickel powder or the nickel-based alloy powder as the second layer and the layers above the second layer is formed, such that the multi-layered built-up filling laminate has a gradient chemical composition with gradually decreasing copper content from 1 mass % to 20 mass % in the first layer toward an outermost layer.

* * * * *